INVENTORS.
HANNA NAGY KOVACS
ALVIN D. DELMAN
BERNARD B. SIMMS
BY
ATTORNEY

United States Patent Office 3,567,698
Patented Mar. 2, 1971

3,567,698
THERMALLY STABLE SILARYLENE-1,3,4-OXADIAZOLE POLYMERS SOLUBLE IN ORGANIC SOLVENTS
Hanna N. Kovacs, Kew Gardens, Alvin D. Delman, Old Bethpage, and Bernard B. Simms, Franklin Square, N.Y., assignors to the United States of America as represented by the Secretary of the Navy
Filed Sept. 2, 1969, Ser. No. 854,673
Int. Cl. C08g 31/32, 33/04, 47/00
U.S. Cl. 260—78.4
10 Claims

ABSTRACT OF THE DISCLOSURE

Aromatic silicon-containing polyoxadiazoles that are soluble in organic solvents and are oxidation resistant and generally stable up to about 400° C. The polyoxadiazole poly[1,4 - phenylene(diphenylsilyl) - 1,4 - phenylene-2,5-(1,3,4-oxadiazole)] prepared by thermal cyclodehydration of the polyhydrazide obtained by copolymerization of bis(p - chlorocarbonylphenyl)diphenylsilane or bis(p-carbopentachlorophenoxyphenyl)diphenylsilane with either hydrazine or bis(p-carbohydrazidophenyl)diphenylsilane. Other polyhydrazide prepolymers are obtained by copolymerization of bis(p-carbohydrazidophenyl)diphenylsilane with dipentachlorophenyl terephthalate or dipentachlorophenyl isophthalate which yield poly[N-(p-diphenylsilylbenzoyl) - N,N'' - (terephthaloyl) - N''' - (p-benzoyl) dihydrazide] and poly[N-(p-diphenylsilylbenzoyl)-N,N''-(isophthaloyl)-N'''-(p-benzoyl)dihydrazide], respectively. These polyhydrazide prepolymers convert by thermal cyclodehydration into the polyoxadiazoles poly[1,4-phenylene(diphenylsilyl) - 1,4 - phenylene - (1,3,4 - oxadiazole-2,5 - diyl) - 1,4 - phenylene - 2,5 - (1,3,4 - oxadiazole)] and poly[1,4 - phenylene(diphenylsilyl) - 1,4 - phenylene-(1,3,4 - oxadiazole - 2,5 - diyl) - 1,3 - phenylene - 2,5-(1,3,4-oxadiazole)], respectively. The previously recited polyoxadiazole poly[1,4 - phenylene(diphenylsilyl) - 1,4-phenylene-2,5-(1,3,4-oxadiazole)] is somewhat more heat resistant than the other oxadiazoles.

Figure 1:
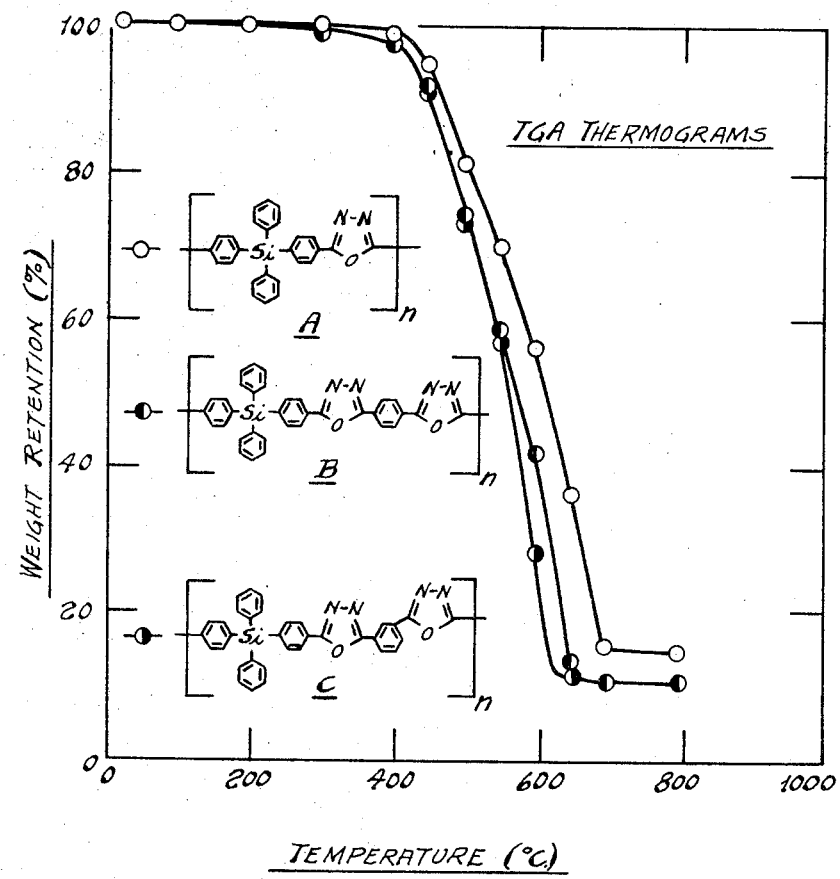

The invention described herein may be manufactured and used by or for the Government of the United States of America for governmental purposes without the payment of any royalties thereon or therefor.

BACKGROUND OF THE INVENTION

There has long been a need for a solid-state material that is soluble in organic solvents, stable over a temperature range up to several hundred degrees centigrade, applicable as a pliable protective adherent coating to a smooth-surfaced metal or glass substrate, capable of being molded, formed into sheet film or extruded as a filament, and preferably has good electrical insulating properties.

In recent years, many investigations have been carried out concerning the preparation of thermally stable polymers with recurring units containing aromatic structures. For example, thermally stable aromatic poly-1,3,4-oxadiazoles have been prepared and reported on as follows: E. J. Abshire and C. S. Marvel, Makromol. Chem. volume 44, page 388, 1961; A. H. Frazer, W. Sweeney, and F. T. Wallenberger, Journal of Polymer Science A, volume 2, page 1157, 1964; Y. Iwakura, K. Uno, and S. Hara, Journal of Polymer Science A, volume 3, page 45, 1965. The polymers showed remarkable thermal and chemical stability, but are soluble only in strong acids such as concentrated sulfuric, polyphosphoric, and trifluoroacetic acids and are insoluble in any organic solvent. The insolubility of the aromatic poly-1,3,4-oxadiazoles described in the preceding references severely limits their utility for practical applications.

SUMMARY OF THE INVENTION

We have discovered new polymers, fully aromatic poly-1,3,4-oxadiazoles having a silicon atom attached to at least two aromatic groups in the recurring unit of the polymer and two groups pendant from the silicon atom which are identical or different and which are selected from the following: aryl, alkyl, aralkyl, or alkaryl.

The general structural formula for the polymer is

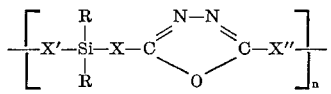

wherein X and X' represent the same or different aromatic groups including phenylene, biphenylene, naphthylene, anthrylene, and fluorenylidene groups where X'' is solely part of the bond between two repeating units or where X'' is

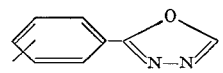

wherein

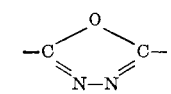

is 1,3,4-oxadiazole and

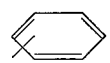

is one of the group consisting of 1,4-phenylene

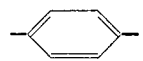

and 1,3-phenylene

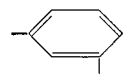

and where R and R' represent the same or different aryl, alkyl, aralkyl, and alkaryl radicals including phenyl, tolyl, methyl, ethyl, propyl, butyl, and phenylmethyl radicals. An example of a more specific structural formula of silicon-containing poly-1,3,4-oxadiazole in accordance with this invention has the general structural formula

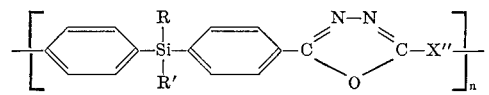

wherein R and R' are as listed above. The structural formula of a specific silicon-containing poly-1,3,4-oxadiazole within the scope of the more general structural formulas above and having the desired properties is

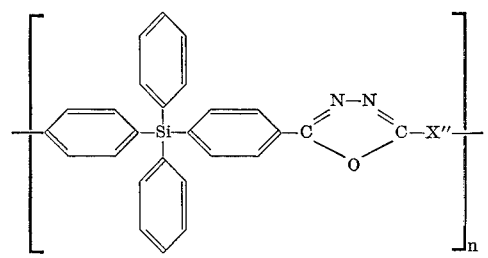

This structure is that form of the more general structure described above wherein X'' is part of the bond between repeating groups.

Also, we have synthesized a novel class of silicon-containing compounds that we condensed with hydrazine or with an inorganic salt of hydrazine, at a temperature of 0° C. to 300° C. in the presence of a solvent, and at atmospheric pressure. Silicon-containing aromatic polyhydrazides thus formed are then subjected to thermal cyclodehydration by usual means to produce the novel silicon-containing aromatic poly-1,3,4-oxadiazoles described above. For example, the silicon-containing polyhydrazide was synthesized by reacting bis(p-chlorocarbonylphenyl) diphenylsilane and alkalized hydrazine sulfate;

where is either

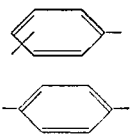

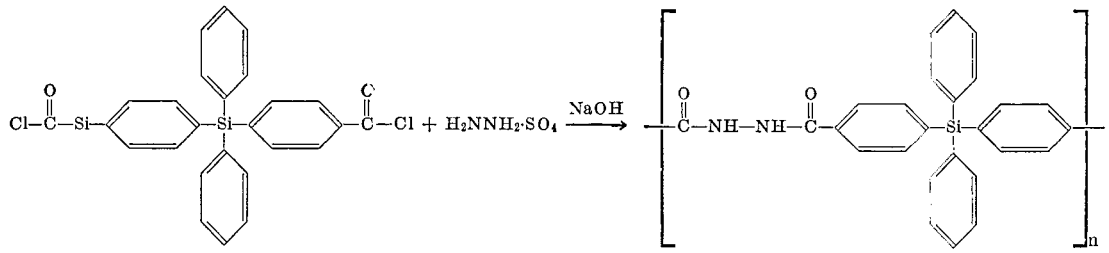

The same polyhydrazide was synthesized by reacting bis (p-carbohydrazidophenyl) diphenylsilane with either bis (p-chlorocarbonylphenyl)diphenylsilane in the presence of triethylamine in the temperature range 0° C. to +10° C. or with bis(p-carbopentachlorophenoxyphenyl)diphenylsilane at elevated temperatures as follows:

for the terephthalate or

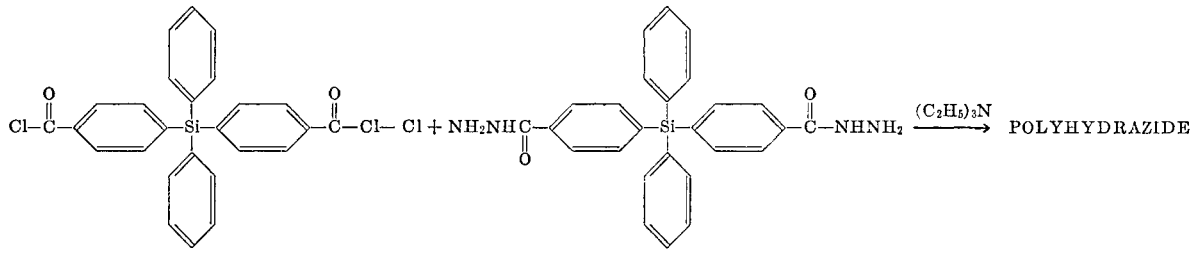

and

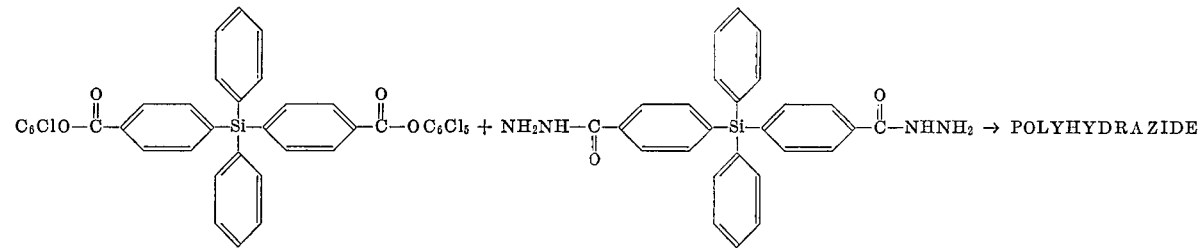

respectively. Also a silicon-containing polydihydrazide was synthesized by reacting bis(p-carbohydrazidophenyl)diphenylsilane with either dipentachlorophenyl terephthalate or with dipentachlorophenyl isophthalate. The reactants are refluxed in solvent.

for the isophthalate. The silicon-containing polyhydrazide prepolymers were converted to the polyoxadiazoles:

(A) Poly[1,4-phenylene(diphenylsilyl)-1,4-phenylene-2,5-(1,3,4-oxadiazole)],

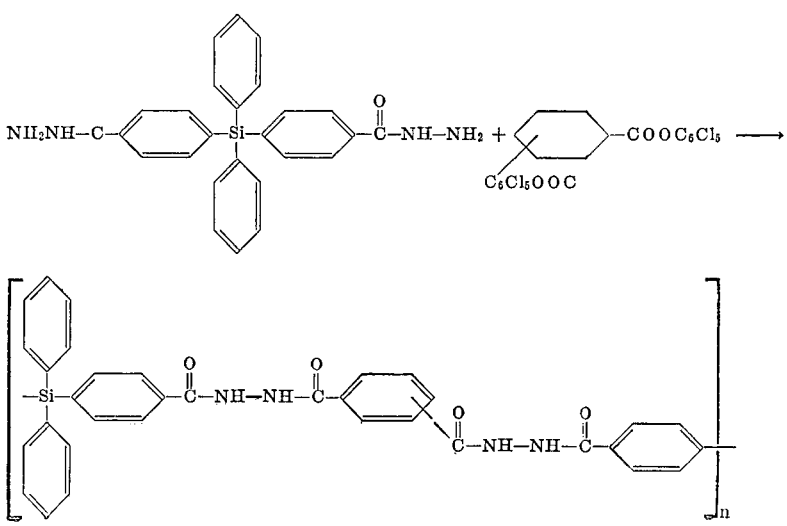

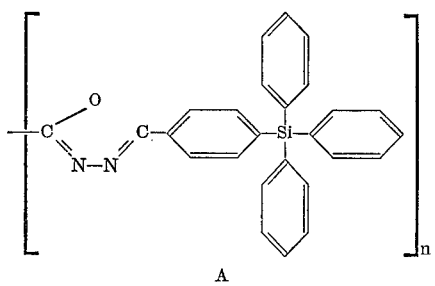

A (B) Poly[1,4-phenylene(diphenylsilyl) - 1,4 - phenylene-(1,3,4 oxadiazole-2,5-diyl) - 1,4 - phenylene-2,5-(1,3,4-oxadiazole)], and (C) Poly[1,4-phenylene(diphenylsilyl) - 1,4 phenylene (1,3,4-oxadiazole - 2,5 - diyl)-1,3-phenylene-2,5-(1,3,4-oxadiazole)]

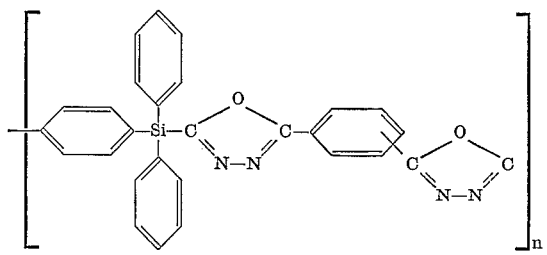

B AND C

The thermal cyclodehydration was carried out by gradually heating the prepolymer under vacuum to about 300° and maintaining that temperature for several hours and permitting the temperature to return to room temperature. After thermal cyclodehydration, infrared spectra taken of the products included peaks characteristic of oxadiazole structure.

Films of all the silicon-containing oxadiazoles which were cast from chloroform and methylene chloride solutions exhibited good adhesion to glass and metal surfaces. When these films were heated in air at about 300° C. and redissolved, they showed increased inherent viscosity in pyridine and were less soluble in the chlorinated solvents.

IN THE DRAWINGS

Figure 2:
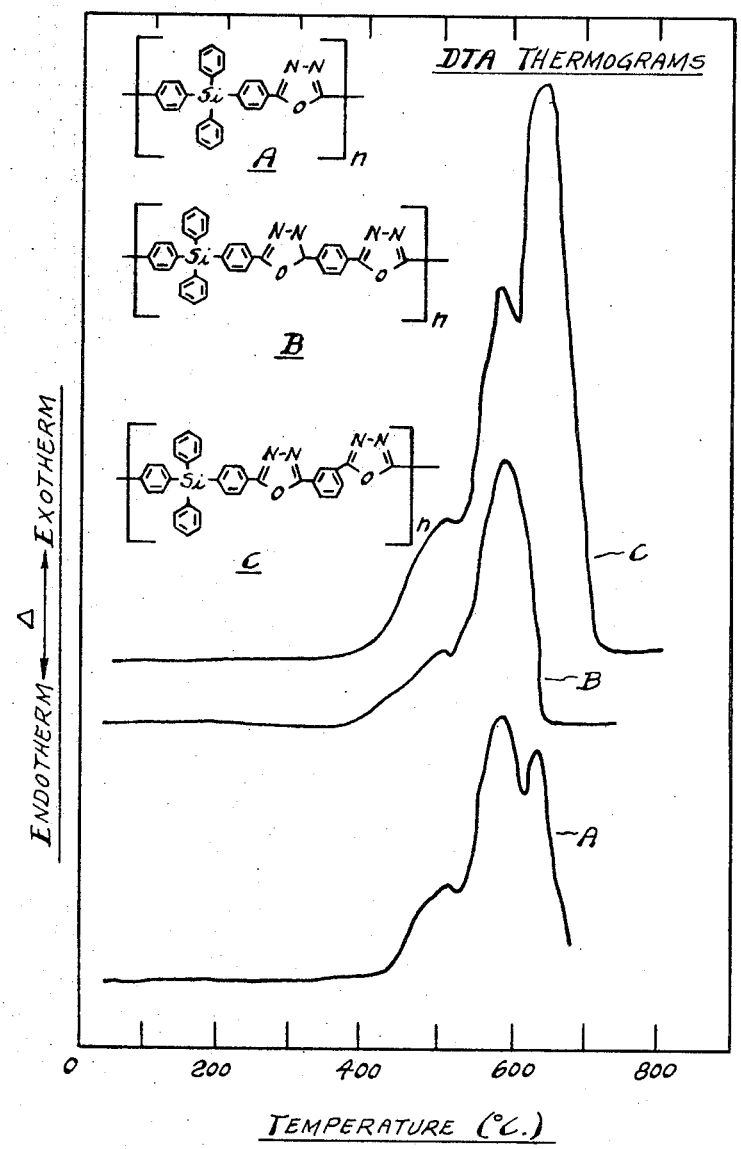

FIGS. 1 and 2 are thermogravimetric and differential thermal analysis graphs respectively of the novel polyoxadiazoles of this invention.

DESCRIPTION

In this invention, diphenyldi(p-tolyl)silane was prepared by reacting 4-bromotoluene with lithium to obtain 4-lithiotoluene and then by reacting the 4-lithiotoluene with diphenyldichlorosilane, following the procedure reported by M. Maienthal et al. in Journal of the American Chemical Society, 1954, volume 76, page 6392. S. B. Speck reports a method of preparing the dicarboxylic acid bis(p-carboxyphenyl)diphenylsilane in U.S. Pat. 2,722,524 by oxidation of diphenyldi(p-tolyl)silane with potassium permanganate. The compound prepared according to the Speck procedure is not sufficiently pure for the purposes set forth in this application; a purer dicarboxylic acid more suitable for the purposes described was produced by oxidizing the diphenyldi(p-tolyl)silane with chromic anhydride in a mixture of acetic acid and acetic anhydride.

Example 1

Oxidation of diphenyldi(p-tolyl)silane to bis(p-carboxyphenyl)diphenylsilane.—A well-stirred solution of 90 milliliters of glacial acetic acid, 30 milliliters of acetic anhydride and 7.2 milliliters of concentrated sulfuric acid was cooled to +10° C. While continuously agitating the partially frozen mixture, about 1.5 grams of chromic anhydride was added; then about 0.3 gram of diphenyldi(p-tolyl)silane was added. This sequence was repeated until a total of 0.12 mole (12 grams) of chromic anhydride was added and a total of 0.012 mole (4.4 grams) of diphenyldi(p-tolyl)silane was added, a molar ratio of 10 to 1. The two reactants were added alternately to the mixture over a period of 50 minutes. During this time, temperature of the reaction mixture was kept down to between 13–15° C. Stirring was continued for another seventy-five minutes while permitting a slight rise in temperature but strictly preventing the temperature from rising above 17° C. Then the reaction mixture was poured over crushed ice and stirred vigorously for 1 hour following which the mixture was filtered and a pale precipitate was obtained which was washed several times with water. The wet precipitate was then dissolved in ether. The ether solution was separated from a gummy residue and then from some of the water, and then dried over anhydrous magnesium sulfate. The drying agent was filtered out and washed thoroughly with ether three times. The ether solution combined with the ether washings was concentrated under vacuum until crystals started to form. Then petroleum ether (boiling range 37–48° C.) was added, and 3.63 grams of crude bis(p-carboxyphenyl)diphenylsilane was isolated (yield 71%) which melted in the temperature range 258°–262° C. This crude product was dissolved in ether, and petroleum ether was added slowly until faint cloudiness appeared. Then the solution was treated with charcoal, concentrated under vacuum until crystals appeared, and diluted with an equal volume of petroleum ether. The crystals were separated by filtration and dried; the purified crystals melted in the temperature range 266–268° C.

Example 2

Oxidation of diphenyldi(p-tolyl)silane to bis(p-carboxyphenyl)diphenylsilane.—To a well stirred suspension of 0.03 mole (10.92 grams) of diphenyldi(p-tolyl)silane in a mixture of 450 milliliters of glacial acetic acid, 150 milliliters of acetic anhydride, and 18 milliliters of concentrated sulfuric acid, was added 1.2 moles (120 grams) of chromic anhydride over a period of 55 minutes while maintaining the temperature of the mixture at 15° C. The reaction mixture was stirred for an additional 10 minutes, poured over ice and stirred vigorously for about 30 minutes. After filtering, the residue was washed thoroughly with water and air-dried to produce 12.3 grams (96% yield) of colorless crude products, melting point 258–264° C. (uncorrected). The crude material was dissolved in acetone, treated with activated charcoal, filtered, and reprecipitated with water. The precipitate was separated, dried, and dissolved in 250 milliliters of ether. The insoluble material was removed by filtration and the ether solution was concentrated until crystals started to form. Then an equal volume of petroleum ether was added and 9.65 grams of purified white crystalline product was recovered, melting point 266–268° C. (uncorrected).

An elemental analysis was performed on the dicarboxylic acid and it was found to contain 73.57% carbon, 4.76% hydrogen, and 6.57% silicon. The product was identified as bis(p-carboxyphenyl)diphenylsilane

which includes 73.56% carbon, 4.75% hydrogen, and 6.62% silicon.

The diacid chloride bis(p-chlorocarbonyphenyl)diphenylsilane was prepared from the dicarboxylic acid by reacting with thionyl chloride. From the dicarboxylic acid or from the diacid chloride, the following three esters were prepared: bis(p-carbomethoxyphenyl)diphenylsilane, bis[p-carbo(p-nitrophenoxy)phenyl] diphenylsilane, bis(p - carbopentachlorophenoxyphenyl)diphenylsilane. These three esters were reacted with hydrazine to produce the dihydrazide. The dipentachlorophenyl terephthalate and dipentachlorophenyl isophthalate are synthesized from the respective acids or acid chlorides.

Example 3

Preparation of the acid chloride bis(p-chlorocarbonylphenyl)diphenylsilane.—A mixture of 0.015 mole (6.36 grams) of bis(p-carboxyphenyl)diphenylsilane, the product of Example 1 or 2, and 120 milliliters of thionyl chloride was refluxed for 40 minutes. The resulting clear solution was concentrated to dryness and the residue recrystallized from ligroin (boiling point 90–120° C.) to produce 6.3 grams (91% yield) of solid product, melting point 183–185° C. (uncorrected). An elemental analysis was performed on the product and found to contain 67.62% carbon, 4.44% hydrogen, 15.07% chlorine, and 5.97% silicon. The product was identified as bis(p-chlorocarbonylphenyl)diphenylsilane $C_{26}H_{18}Cl_2O_2Si$ for which the calculated proportions of the corresponding elements are 67.68% carbon, 3.93% hydrogen, 15.37% chlorine, 6.09% silicon.

An infrared spectrum was taken of the products of Examples 1 and 2 and they were found to have a carboxyl group absorption band of 5.9 microns. The product of Example 3 did not have the 5.9 micron carboxyl group absorption peak but had instead two peaks in the carbonyl region at 5.64 and 5.76 microns.

Example 4

Preparation of the ester bis(p-carbomethoxyphenyl)diphenylsilane from the dicarboxylic acid, bis(p-carboxyphenyl)diphenylsilane 0.01 mole (4.25 grams) of pure bis(p-carboxyphenyl)diphenylsilane, the product of Example 2, is added in several fractional amounts to an ice-cooled yellow solution of excess diazomethane in ether. The dicarboxylic acid, though not readily soluble in ether, dissolved readily in the diazomethane solution with bubbling; nitrogen gas was released. The active bubbling indicated that the esterification reaction was occurring at a rapid rate. When the reaction terminated, the yellow ether solution thus obtained was evaporated to dryness under vacuum. The residue had a melting point, uncorrected, between 168° and 169° C. The residue was dissolved in a mixture of 9 parts methyl alcohol and 1 part ethyl acetate and was recrystallized. The white crystalline product recovered weighed 4.1 grams (90% yield) and had a melting point within the range 169–170° C. From elemental analysis, the material was found to include 74.30% carbon, 5.35% hydrogen, and 5.70% silicon. It was identified as bis(p-carbomethoxyphenyl)diphenylsilane, $C_{28}H_{24}O_4Si$ for which the calculated proportions of the corresponding elements are 74.31% carbon, 5.35% hydrogen, and 6.21% silicon and the melting point is in accord with 169–170° C. reported in U.S. Pat. 2,722,524.

Example 5

Preparation of the ester bis[p-carbo-(p-nitrophenoxy)phenyl]diphenylsilane from the dicarboxylic acid product of Examples 1 and 2.—A solution of 0.01 mole (1.4 grams) of p-nitrophenol and 0.01 mole (2.06 grams) dicyclohexylcarbodiimide dissolved in 50 milliliters of dry ethyl acetate was left standing at room temperature for 10 minutes. Then 0.0025 mole (1.06 grams) of the dicarboxylic acid bis(p-carboxyphenyl)diphenylsilane, the product of Examples 1 or 2 was added in several fractional amounts. After a few minutes, crystals began to separate out. The reaction mixture was left at room temperature for 15 hours, then refluxed for 3 hours and cooled in an ice bath and filtered. The crystals that were separated out were washed, first with ice-cold ethyl acetate and then with ether. The washed residue was triturated with hot benzene; there was left 647 milligrams (57.8% yield) of by product dicyclohexylurea, melting point 228–230° C., uncorrected. The benzene solution was evaporated to dryness and the residue was washed with methyl alcohol, yielding 363 milligrams of the product which melted in the temperature range 290–292° C., uncorrected. Then the mother liquor of the original reaction mixture was concentrated to an oily crystalline paste that was washed first with ether and then with hot methyl alcohol. From the mother liquor, there was obtained additional 325 milligrams of crude product (total yield 42%), which was recrystallized from a mixture of 1 part benzene and 10 parts methyl alcohol; the recrystallized product melted in the temperature range 291–202° C., uncorrected. Elemental analysis was performed on the products and they were found to include 68.72% carbon, 3.88% hydrogen, 4.56% nitrogen, and 4.48% silicon. The calculated proportions of the corresponding elements of the dinitrophenyl ester $C_{38}H_{26}N_2O_8Si$ are 68.45% carbon, 3.94% hydrogen, 4.20% ntrogen, and 4.21% silicon, confirming identification of the product.

EXAMPLE 6

Preparation of the ester bis(p-carbopentachlorophenoxyphenyl)diphenylsilane from the dicarboxylic product of Example 1 or 2.—A solution of 0.04 mole (84 grams) of dicyclohexylcarbodiimide in 50 milliliters of dry ethyl acetate was added to a solution of 0.04 mole (10.64 grams) pentachlorophenol in 50 milliliters of the same solvent. The clear solution was left standing at room temperature for 10 minutes. A suspension of 0.01 mole (4.24 grams) of the dicarboxylic acid bis(p-carboxyphenyl)diphenylsilane in 100 milliliters of ethyl acetate was added to the clear solution. The dicarboxylic acid dissolved immediately and, after a few seconds, crystal formation was observed. The reaction mixture was left standing at room temperature for 15 hours; then, in succession, the reaction mixture was refluxed for 2.5 hours, concentrated under vacuum to a volume of about 100 milliliters, and cooled in an ice bath for several hours, filtered, and the separated crystalline material was washed in sequence with ice-cold ethyl acetate, acetone, and ether to remove unreacted materials, leaving 12.5 grams of residue. The residue was washed with 300 milliliters of benzene. Most of the residue dissolved. There remained 4.1 grams of insoluble by product dicyclohexylurea which melted in the temperature range 228–230° C. uncorrected. The benzene solution was concentrated under vacuum to a volume of 50 milliliters. The concentrated solution was diluted then with 250 milliliters of dry acetone and the mixture was cooled in an ice bath for 1 hour and then filtered. The separated product weighed 6.5 grams and melted in the temperature range 269–271° C., uncorrected. An additional 1 gram of the product was recovered from the mother liquor for a total yield of 81.4%. A sample of the latter, for analysis, was dissolved in and recrystallized from a solution of 1 part benzene and 10 parts ethyl acetate and dried in vacuum over boiling water. Its melting point was in the range 269–271° C., uncorrected. An elemental analysis of the product established that it included 49.94% carbon, 1.95% hydrogen, 38.14% chlorine, and 2.91% silicon. The calculated proportions of the corresponding elements of the diester $C_{38}H_{18}Cl_{10}O_4Si$ is 49.55% carbon, 1.9% hydrogen, 38.49% chlorine, and 3.05% silicon. The analysis confirms the identity of the product as bis (p-carbopentachlorophenoxyphenyl)diphenylsilane.

When the molar ratio of dicarboxylic acid pentachlorophenol, and dicyclohexylcarbodiimide was 1:2:2, the N,N′-dicyclohexylurea derivatives of the pentachlorophenyl half-ester, $$C_6Cl_5OOC_6H_4Si(C_6H_5)_2C_6H_4CON(C_6H_{11})CONHC_6H_{11}$$

was isolated in 39% yield and had a melting point in the range 142–145° C., uncorrected. The infrared spectrum of the product was consistent with the half-ester structure. The elemental analysis of the product established that it included 61.54% carbon, 4.81% hydrogen, 3.04% nitrogen, 19.32% chloride, and 3.28% silicon. The calculated proportions of the corresponding elements of the half-ester $C_{45}H_{41}Cl_5N_2O_4Si$ is 61.48% carbon, 4.7% hydrogen, 3.18% nitrogen, 20.16% chlorine, and 3.19% silicon confirming the identity of the product as the half-ester.

EXAMPLE 7

Another procedure for preparation of bis(p-carbopentachlorophenoxyphenyl)diphenylsilane.—To a solution of 4.5 millimoles (1.198 grams) of pentachlorophenol and 4 millimoles (.56 milliliter) of triethylamine in 15 milliliters of methylene chloride was added 1.95 millimole (0.901 gram) of the acid chloride bis(p-chlorocarbonylphenyl)diphenylsilane, the product of Example 3, dissolved in 10 milliliters of the same solvent. After standing at room temperature for 3 hours, the clear solution was concentrated under vacuum to about 10 milliliters, heated to a boil, diluted with 50 milliliters of ethyl acetate, cooled in an ice bath and filtered. The separated crystalline solid was washed with ethyl acetate and triturated with 75 milliliters of benzene. The insoluble material, triethylamine salt was discarded and the benzene solution was concentrated to 5 milliliters, diluted with 90 milliliters of acetone, and cooled in an ice bath, to recover 1.02 grams of product with melting point in the range 268–270° C. The methylene chloride and ethyl acetate mother liquor was evaporated to dryness and the crystalline residue was washed with hot acetone to obtain additional 0.335 gram of crude product with melting point in the range 262–264° C., for a total yield of 75%. The crude product was dissolved in and recrystallized from a mixture of 1 part benzene and 10 parts ethyl acetate and then had a melting point in the range 269–271° C. An infrared spectrum of this product proved to be identical to that taken of the product of Example 6 confirming its identity.

Each of the esters bis(p-carbomethoxyphenyl)diphenylsilane, the product of Example 4:

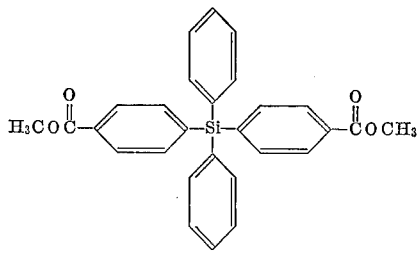

and bis[p-carbo-(p-nitrophenoxy)phenyl]diphenylsilane, the product of Example 5

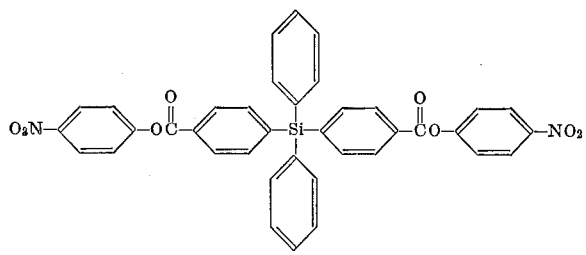

and bis(p - carbopentachlorophenoxyphenyl)diphenylsilane

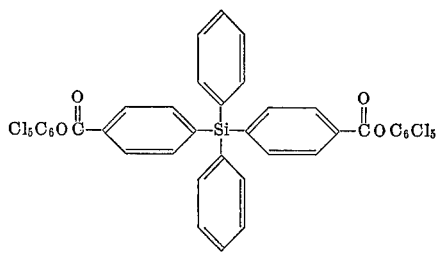

were reacted with excess hydrazine $H_2N-NH_2$ to yield bis(p-carbohydrazidophenyl)diphenylsilane

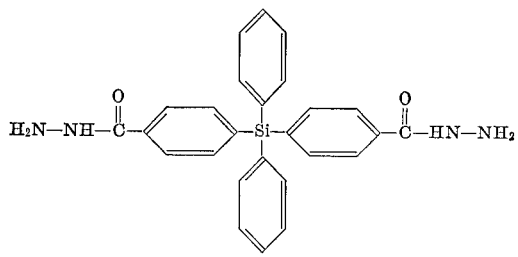

EXAMPLE 8

Preparation of bis(p-carbohydrazidophenyl)diphenylsilane.—To a vigorously stirred boiling solution of 9 milliliters of 97% hydrazine in 270 milliliters of dry methyl alcohol was added 3.9 millimoles (3.6 grams) of the pentachlorophenyl ester product of Examples 6 or 7. The mixture was refluxed for 2 hours. The clear solution thus obtained was left standing over night at room temperature. The next day it was placed in an ice bath for one hour and then was filtered. After the separated crystals were washed with benzene and with ice cold methyl alcohol, 1.7 grams of crude product (96% yield) were obtained; the freshly prepared product upon being heated melted at 170–172° C. In 24 hours, the melting point changed considerably; upon being heated the crystals softened at 114–116° C. and as the temperature continued to increase, solidified in the range 145–146° C., softened again in the range 168–170° C., resolidified at 174–175° C., and finally melted in the range 202–203° C. Some of the crude product was purified by being dissolved and recrystallized from a mixture of 1 part dimethylacetamide and 10 parts ethyl alcohol. Some of the crude product was purified by being dissolved and recrystallized from a mixture of 1 part tetrahydrofuran and 10 parts benzene. The product purified by each method was dried at 100° C. An elemental analysis on the product established that it included 68.91% carbon, 6.03% hydrogen, 12.01% nitrogen and 6.13% silicon. The calculated proportions of the corresponding elements of the dihydrazide bis(p-carbohydrazidophenyl)diphenylsilane, $C_{26}H_{24}O_2N_4Si$, is 69.00% carbon, 5.34% hydrogen, 12.38% nitrogen and 6.20% silicon confirming the identity of the product. Similarly to the crude product, the purified crystals manifest a series of phase changes when heated; the solid crystals soften in the temperature range 114–116° C., solidify at 140° C., soften again at 172–174° C., resolidify at 175° C. and finally melt in the temperature range 204–205° C. After the dihydrazide was heated at 180° C. and left to cool to room temperature, and then heated, there was no phase changes till it melted in the temperature range 204–250° C. Infrared spectral data taken at several times indicated that the product was not chemically changed when heated during the melting point determination. Observations of phase transformations were made by constantly probing at the dihydrazide sample with a thin glass rod as the sample temperature was raised. Using the conventional method, the dihydrazide softened in the range 110–118° C. and liquified slowly, clarifying at about 200° C.

EXAMPLE 9

Another method of preparing bis(p-carbohydrazidophenyl)diphenylsilane.—To a mixture of 5 milliliters of 97% hydrazine, 200 milliliters of dry methyl alcohol and 15 milliliters of benzene was added in fractional amounts, 3.27 millimoles (2.18 grams) of p-nitrophenyl ester, the product of Example 5. The reaction mixture was refluxed for 15 minutes and it became clear. Refluxing was continued for 2 hours and then left standing at room temperature for 20 hours. Then the solution was placed in ice for 1 hour and filtered. There was separated 1.33 grams (90% yield) of product that melted in the temperature range 200–202° C. The product was identified as the same dihydrazide as was obtained in Example 8.

EXAMPLE 10

Another method of preparing bis(p-carbohydrazidophenyl)diphenylsilane.—To 8 milliliters of dry methyl alchohol was added 2.2 millimoles (1 gram) of the dimethyl ester bis(p-carbomethoxyphenyl)diphenylsilane with 1.5 milliliters of 97% hydrazine and the mixture was refluxed for 3 hours. Substantial crystal separation was observed after the reaction mixture stood at room temperature for 20 minutes. The mixture was cooled in an ice bath and filtered. There was obtained 900 milligrams (90% yield) product which melted in the temperature range 200–202° C. The product was identified as bis(p-carbohydrazidophenyl)diphenylsilane by the methods described.

EXAMPLE 11

Efforts to recrystallize bis(p-carbopentachlorophenoxyphenyl)diphenylsilane from acetone yielded mono (N-isopropylidine) bis(p - carbohydrazidophenyl)diphenylsilane.—The dihydrazide bis(p-carbohydrazidophenyl)diphenylsilane of Example 8, 9 or 10 was triturated with acetone at room temperature. The dihydrazide dissolved and after several seconds, crystalline product which melted in the temperature range 298–300° C., separated out. The product was dissolved in and recrystallized from dimethyl acetamide and when thus purified, melted in the temperature range 305–306° C. The same product was crystallized analytically pure when acetone was added to a solution of dihydrazide in tetrahydrofuran and the solution was refluxed for several minutes. An elemental analysis on the product obtained by each method established that it included 71.11% carbon, 6.41% hydrogen, 11.43% nitrogen, 5.70% silicon. The calculated proportions of the corresponding elements in mono(n-isopropylidene)-bis (p-carbohydrazidophenyl)diphenylsilane $$C_{29}H_{28}N_4O_2Si$$

being 70.72% carbon, 5.73% hydrogen, 11.38% nitrogen, and 5.70% silicon confirmed the identity of the product.

The diesters dipentachlorophenylterephthalate and dipentachlorophenylisophthalate were prepared in high yield from the reaction of pentachlorophenol with terephthaloylchloride and isophthaloylchloride respectively, in the presence of triethylamine. The preparation of the diesters by esterification of terephthalic acid and isophthalic acid with pentachlorophenyl, using dicyclohexylcarbodiimide to dehydrate, was found to be too slow because of the low solubility of the acid in the solvent. The separation of the diesters from the dicyclohexylurea product was laborious.

EXAMPLE 12

Preparation of pentachlorophenyl terephthalate.—A solution of 0.01 mole (2.03 grams) of terephthaloyl chloride in 40 milliliters of methylene chloride was added to a solution of 0.025 mole (6.66 grams) of pentachlorophenol and 0.021 mole (2.93 milliliters) of triethylamine in 80 milliliters of methylene chloride. A dense distribution of crystalline precipitate formed immediately. The product was filtered out and was washed with methylene chloride. The washed precipitate weighed 6.1 grams (92% yield) and melted in the temperature range 328–330° C. It was recrystallized from boiling xylene which melted in the temperature range 334° C.–336° C. (with decomposition) measured in a melting point apparatus preheated to 230° C.

The infrared spectrum of the product established that it had a peak at 5.67 microns which is characteristic of the pentachlorophenyl ester group.

An elemental anlysis of the product established that it included 36.58% carbon, 0.75% hydrogen, and 53.65% chlorine. The calculated proportions of the corresponding elements in dipentachlorophenyl terephthalate $$C_{20}H_4Cl_{10}O_4$$

is 36.24% carbon, 0.61% hydrogen, and 53.50% hydrogen confirmed the identity of the product.

EXAMPLE 13

Another method of preparing dipentachlorophenyl terephthalate.—To a solution of 0.01 mole (2.66 grams) of pentachlorophenol in 15 milliliters of dry ethyl acetate, there was added 0.01 mole (2.06 grams) of dicyclohexyldiimide in 15 milliliters of dry ethyl acetate. The reaction mixture was left standing at room temperature for 10 minutes and then there was added to it a suspension of 0.0025 mole (0.42 gram) of terephthalic acid in 90 milliliters of ethyl acetate. The mixture was refluxed for 26 hours and filtered. The insoluble fraction was washed with ethyl acetate, large quantities of hot chloroform, and tetrahydrofuran; all of the dicyclohexylurea by-product that may have been part of the product was thus removed. The remainder of the product weighed 0.90 gram (54% yield) and melted in the temperature range 320–326° C., but after being further purified by being dissolved in and recrystallized from a mixture 2.5 parts benzene and 1 part tetrahydrofuran, it melted in the temperature range 334–336° C., though it softened in the temperature range 304–306° C. It was identified as the same product as in Example 12.

EXAMPLE 14

Preparation of dipentachlorophenyl isophthalate.—A solution of 0.01 mole (2.03 grams) of isophthaloyl chloride in 40 milliliters of methylene chloride was added to a solution of 0.25 mole (6.66 grams) of pentachlorophenol and 0.21 mole (2.93 milliliters) of triethylamine in 80 milliliters of methylene chloride. A dense distribution of precipitate formed immediately. The product was filtered out and was observed to be crystalline. It was washed with methylene chloride. The washed crystalline product weighed 625 grams (94% yield) and melted in the temperature range 258–268° C. The product was dissolved in and recrystallized from boiling xylene which melted in the temperature range 296–298° C., determined in a melting point apparatus preheated to 230° C. An elemental analysis performed on the product established that it included 36.47% carbon, 0.67% hydrogen, and 53.48% chlorine. The calculated composition of the corresponding elements in the diester diphentachlorophenyl isophthalate $C_{20}H_4Cl_{10}O_4$ is 36.24% carbon, 0.61% hydrogen, and 53.50% chlorine. The identity of the product was confirmed also by infrared spectral analysis which showed the characteristic ester peak at 5.65 microns.

EXAMPLE 15

Another method for preparation of dipentachlorophenyl isophthalate.—To a stirred solution of 0.12 mole (31.92 grams) of pentachlorophenol in 150 milliliters of ethyl acetate there was added 0.12 mole (24.75 grams) of dicyclohexylcarbodiimide in 200 milliliters of ethyl acetate. The reaction mixture was left standing at room temperature for ten minutes. Then 0.03 mole (4.98 grams) of isophthalic acid was added to the reaction mixture in small amounts. The mixture was diluted with 150 milliliters of solvent and was refluxed for 20 hours. The mixture was filtered to separate the solid reaction products. To eliminate most of the dicyclohexylurea by-product from the separated solid material, it was washed several times with tetrahydrofuran. The insoluble residue was dissolved in 600 milliliters of boiling xylene and the solution was cooled to 70° C. The residuum of dicyclohexylurea that was not washed out with the tetrahydrofuran was filtered out of the xylene solution and discarded. After standing for several hours, a precipitate formed in the solution. The solution was filtered and 10 grams (50% yield) of crystalline product was isolated, which melted in the temperature range 280–286° C. The product was redissolved in xylene and recrystallized and the purified product melted in the temperature range 296–297° C.

The dihydrazide is used in the preparation of prepolymer polyhydrazides. The inherent viscosity of these prepolymers was determined at 30° C. from dimethylacetamide solutions containing 0.2% of the prepolymer and 5% lithium chloride.

The dihydrazide bis(p-carbohydrazidophenyl)diphenylsilane, the product of Examples 8, 9 and 10 was reacted with diacid chloride bis(p-chlorocarbonylphenyl)diphenylsilane, the product of Example 3 or with the diester bis(p-carbopentachlorophenoxyphenyl)diphenylsilane the product of Examples 6 and 7 to form polyhydrazides poly[N-(p-diphenylsilylbenzoyl) - N' - (p-benzoyl)hydrazide]

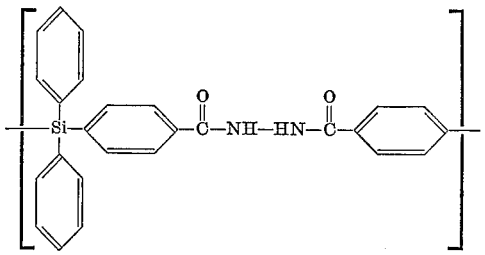

with inherent viscosities of 0.37 and 0.59, respectively. The polymer samples were converted by thermal cyclodehydration into poly(1,3,4-oxadiazole). N,N-dimethylaniline and N-methylpyrrolidone used in polyhydrazide synthesis were distilled prior to such rise. Inherent viscosity measurements of the polyoxadiazoles were made at 30° C. and were made from chloroform and pyridine solutions containing 0.2% of polymer.

EXAMPLE 16

Preparation of the polyhydrazide poly[N-(p-diphenylsilylbenzoyl)-N'-(p-benzoyl)hydrazide].—To a stirred ice-cooled solution of 3 millimole (1.384 grams) of acid chloride bis(p-chlorocarbonylphenyl)diphenylsilane, the product of Example 3, in 75 milliliters of methylene chloride was added 3 millimole (0.39 gram) of hydrazine sulfate dissolved in 120 milliliters of 0.1 N potassium hydroxide. The mixture in an ice bath was stirred for 1 hour. A precipitate formed, was separated by filtration and washed with acetone, methyl alcohol, and benzene, successively and several times in sequence with acetone and water. After the washings there remained 1.18 grams (93.6% yield) of product. The product in .5% solution (rather than 0.2 referred to previously) has inherent viscosity of 0.56. An elemental analysis of the product established that it included 74.31% carbon, 4.42% hydrogen, 6.80 nitrogen, 6.67% silicon. The calculated proportions of the corresponding elements in the polyhydrazide $(C_{26}H_{20}N_2O_2Si)_n$ is 74.26% carbon, 4.79% hydrogen, 6.66% nitrogen, and 6.68% silicon, confirming the identity of the product.

EXAMPLE 17

Preparation of the polyoxadiazole from the polyhydrazide product of Example 16.—A 0.05 gram sample of the silicon-containing polyhydrazide product of Example 16 was very well pulverized and heated at 1 millimeter pressure within 1 hour at 170° C. and then that temperature was maintained for 1 hour. Then the temperature was raised to 240° C. and maintained for 40 minutes and elevated to 285° C. and maintained there for 35 minutes. The resultant caked material was beige color. It was cooled to room temperature, pulverized, and heated under vacuum for 4 hours at 285° C. The product was washed with acetone dissolved in 25 milliliters of chloroform, and poured into 250 milliliters of petroleum ether. The white precipitate that formed was filtered out and washed in petroleum ether and dried.

The white solid thus obtained weighed 0.31 gram (64.6% yield) and in .25% solution had an inherent viscosity of 0.23. An elemental analysis established that the product included 77.26% carbon, 4.54% hydrogen, 6.61% nitrogen and 7.53% silicon. The calculated proportions of the corresponding elements in the polyoxadiazole $(C_{26}H_{18}N_2OSi)_n$ are 77.58% carbon, 4.50% hydrogen, 6.96% nitrogen, and 6.98% silicon.

EXAMPLE 18

Another method of synthesizing poly[N-(p-diphenylsilylbenzoyl)-N'-(p-benzoyl)hydrazide].—A mixture of 3 millimoles (0.763 grams of the dipentachlorophenylester bis(p-carbopentachlorophenoxyphenyl)diphenylsilane the product of Example 7 and 3 millimoles (1.358 grams) of the dihydrazide bis(p - carbohydrazidophenyl)diphenylsilane, the product of Examples 8, 9 and 10 in 65 milliliters of dimethylaniline was heated with constant stirring under nitrogen in a Wood's metal bath at 135–140° C. for two hours during which time the solution cleared. The solution was then heated to 155–160° C. and maintained at temperature for 19 hours; gel formation occurred. Then the reaction mixture was diluted with 16 milliliters of dimethylaniline, heated to and for 74 hours maintained at 178–183° C., refluxed for 48 hours, cooled to room temperature and filtered. The separated precipitate was washed with ethyl acetate, methanol and methylene chloride. The product weighed 2 grams (79% yield) and had inherent viscosity of 0.59, was soluble in dimethylacetamide, dimethylformamide, pyridine, and dimethyl sulfoxide. An elemental analysis of the product established that it included 74.01% carbon, 5.15% hydrogen, 6.67% nitrogen, and 6.50% silicon. The calculated proportions of corresponding elements of the polyhydrazide $(C_{16}H_{20}N_2O_2Si)_n$ is 74.26% carbon, 4.79% hydrogen, 6.66% nitrogen, and 6.68% silicon. The identity of the product was further confirmed from an infrared spectral analysis.

In another procedure tar formation was observed wherein the same dihydrazide and the same dipentachlorophenyl ester were refluxed in diethylaniline for 12 hours, and in a similar manner to that described above to processed separate out a 61% yield of product with inherent viscosity of 0.36.

EXAMPLE 19

Preparation of poly[1,4-phenylene(diphenylsilyl)-1,4-phenylene - 2,5 - (1,3,4 - oxadiazole)].—A 500 milligram sample of the polyhydrazide prepared according to Example 18 and having inherent viscosity of 0.55 and containing pentachlorophenyl chain ends was heated while pressure was held to 1 millimeter mercury. The temperature of the sample was held in the range 160–170° C. for 40 minutes and then in the range 280°–290° C. for 2 hours and finally in the range 300–310° C. for 3 hours. The resultant product was only partially soluble in chloroform and had inherent viscosity in pyridine of 0.37. An elemental analysis was carried out on the product and it was found to include 77.08% carbon, 4.62% hydrogen, 6.87% nitrogen, and 7.22% silicon. In the polyoxadiazole $(C_{26}H_{18}N_2OSi)_n$ the calculated percentages of the corresponding elements are 77.58% carbon, 4.50% hydrogen, 6.96% nitrogen, and 6.98% silicon confirming the identity of the product. An infrared spectral examination of the product confirmed its identity. A sample quantity of the polyoxadiazole product with inherent viscosity of 0.37 was heated in an open test tube with constant stirring for 1 hour in the temperature range 290–300° C., the inherent viscosity increased to 0.43. From elemental analysis of the latter, it was found that the silicon content was unchanged.

A sample of polyoxadiazole produced in accordance with Example 19 and having inherent viscosity in pyridine of 0.32 was subjected to trituration with chloroform which dissolved 81% of the polymer. The soluble fraction had inherent viscosities of 0.38 and 0.29 in chloroform and pyridine, respectively. The fraction insoluble in chloroform had an inherent viscosity of 0.45 in pyridine. When the chloroform soluble fraction was heated at 290–300° C. for 50 minutes at atmospheric pressure its inherent viscosity in pyridine increased from 0.29 to 0.43.

EXAMPLE 20

Another method of synthesizing poly[N-(p-diphenylsilylbenzoyl)-N'O(p-benzoyl) hydrazide.—To a stirred ice-cooled solution of 1 millimole (452.6 milligrams) of the dihydrazide bis(p-carbohydrazidophenyl)diphenylsilane and 2 millimole (0.28 milliliter) of triethylamine in 20 milliliters of N-methylpyrrolidone, there was added 1 millimole (461.4 milligram) of the acid chloride bis(p-chlorocarbonylphenyl)diphenylsilane in 15 milliliters of the same solvent N-methylpyrrolidone. Triethylamine hydrochloride began to separate immediately. The reaction mixture was stirred for 1 hour in an ice bath and then was stirred at room temperature for 20 hours. To esterify the acid chloride end groups, 12 milliliters of dry methyl alcohol was added. The resulting clear solution was left standing at room temperature for 1 hour. Then it was poured into 600 milliliters of water and the mixture was stirred for 1 hour and then filtered to separate the precipitate. The precipitate was washed with water, methyl alcohol, tetrahydrofuran and petroleum ether. The purified product weighed 832 milligrams (99% yield) and had inherent viscosity of 0.37. The product was dried at 100° C. for elemental analysis. An elemental analysis established that the product included 72.67% carbon, 5.28% hydrogen, 6.34% nitrogen and 6.38% silicon. The calculated proportions of the corresponding elements in the polyhydrazide $(C_6H_{20}N_2O_2Si \cdot 0.5H_2O)_n$ is 72.70% carbon, 4.92% hydrogen, 6.52% nitrogen, and 6.53% silicon.

EXAMPLE 21

Another method of preparing poly[1,4-phenylene(diphenylsilyl)-1,4-phenylene-2,5-(1,3,4-oxadiazole)]. — A polyoxadiazole sample having inherent viscosities of 0.32 and 0.19 in chloroform and pyridine, respectively, was prepared from a sample of the polyhydrazide prepared according to Example 20 from the acid chloride bis(p-chlorocarbonylphenyl)diphenylsilane and that had an inherent viscosity of 0.37. The polyhydrazide while under 1 millimeter of mercury pressure was heated to the temperature range 165–175° C. for 40 minutes, then heated to the temperature range 280–290° C. for 2 hours, then heated to the temperature range 290–300° C. for 5 hours, and finally heated to the temperature range 300–310° C. for 6 hours, and cooled to room temperature. An elemental analysis established that the resultant polymer included 78.01% carbon, 4.14% hydrogen, 6.72% nitrogen, and 6.92% silicon. The calculated proportions of the corresponding elements in $(C_{26}H_{18}N_2OSi)_n$ is 77.58% carbon, 4.50% hydrogen, 6.96% nitrogen, and 6.98% silicon.

When a sample of the same polyoxadiazole was heated in air to the temperature range 315–322° C., it softened and could be formed into a thread with a glass rod. Within 3 hours in this temperature range the sample hardened and its silicon content increased from 6.92 to 7.45%. This indicates that cross-linking occurred during the heating process.

EXAMPLE 22

A method of preparing another polyhydrazide, namely poly[N - (p - diphenylsilylbenzoyl) - N',N'' - (terephthaloyl)-N'''-(p-benzoyl)dihydrazide].—A well stirred suspension of 2 millimole (0.905 gram) of the dihydrazide bis(p-carbohydrazidophenyl)diphenylsilane, the product of Example 8 and 2 millimole (1.325 grams) of dipentachlorophenyl terephthalate, the product of Example 12 or Example 13 in 44 milliliters of dimethylaniline was heated under nitrogen in a Wood's metal bath to the temperature range 135–140° C. for 1 hour. Then the reaction mixture was heated to the temperature range 158–160° C. for 16 hours during which time a precipitate formed. Then 10 milliliters of dimethylaniline was added, the mixture was heated to the temperature range 178–180° C. for 24 hours and refluxed for 24 hours, during which time the precipitate dissolved. On cooling to room temperature, a light-beige precipitate formed. The precipitate was filtered out, washed with methyl alcohol and ethylacetate to produce 1.1 grams (94% yield) of polymer. It had inherent viscosity of 0.59, was soluble in dimethylacetamide, dimethylformamide, pyridine, and dimethyl sulfoxide. An infrared spectral analysis of the polymer exhibited peaks at 6.08 and 6.40 microns respectively, and siliconphenyl vibrations at 7.0 and 9.0 microns. The polymer product was dried at 100° C. under reduced pressure. Then an elemental analysis was performed and it was found to include 67.70% carbon, 4.89% hydrogen, 8.78% nitrogen, and 4.85% silicon. The calculated proportions of the corresponding elements in $(C_{34}H_{26}N_4O_4Si \cdot H_2O)_n$ are 67.98% carbon, 4.69% hydrogen, 9.32% nitrogen, and 4.67% silicon confirming the identity of the product.

EXAMPLE 23

Preparation of poly[1,4 - phenylene(diphenylsilyl)-1,4-phenylene-(1,3,4-oxadiazole-2,5-diyl) - 1,4 - phenylene-2,5-(1,3,4-oxadiazole)] from the polyhydrazide product of Example 22.—A 200 milligram sample of the polyhydrazide product of Example 22 having inherent viscosity 0.59 was heated in a Wood's metal bath under 1 millimeter pressure to the temperature range 150–160° C. for 75 minutes, then was heated to the temperature range 280–290° C. for 5 hours, and finally was heated to the temperature range 290–300° C. for 6 hours. The resultant light-beige polymer was completely soluble in pyridine and dissolved partially in chloroform and in methylene chloride. It had an inherent viscosity of 0.42 in pyridine. An infrared spectral analysis of the polymer showed a broad doublet at 6.37 and 6.5 microns and a peak at 10.4 microns that is associated with the oxadiazole structure and vibration frequencies at 7.0 and 8.9 microns that is attributed to silicon-phenyl bonding. An elemental analysis performed on the polymer established that it included 75.51% carbon, 4.14% hydrogen, 9.85% nitrogen, and 5.17% silicon. The calculated proportions of the corresponding elements in $(C_{34}H_{22}N_4O_2Si)_n$ is 74.71% carbon, 4.06% hydrogen, 10.25% nitrogen, and 5.13% silicon, confirming the identity of the polymer. A chloroform soluble fraction of the polyoxadiazole was cast as a film. A flexible film formed from which absorbed moisture could not be removed completely by heating under reduced pressure at 100° C. but was removed by heating the film for several minutes at 300° C. After being heated for 1 hour in the temperature range 290–310° C., the polymer was insoluble in chloroform without crosslinking, and its inherent viscosity in pyridine increased from 0.28 to 0.32. The latter polymer was analyzed for silicon and it was found to include 5.14% silicon; the calculated proportion of silicon is 5.13%.

EXAMPLE 24

Preparation of another polyhydrazide poly[N-(p-diphenylsilylbenzoyl) - N',N'' - (isopthaloyl)-N'''-(p-benzoyl)dihydrazide.—A mixture of 3 millimoles (1.358 grams) of the dihydrazide bis(p-carbohydrazidophenyl) diphenylsilane, the product of Example 8, 9 or 10 and 3 millimoles (1.988 grams) of dipentachlorophenyl isophthalate, the product of Example 14 or 15, in 66 milliliters of dimethylaniline was gradually heated under nitrogen in a Wood's metal bath to 130–135° C. Within 30 minutes, a clear solution was obtained. Then the bath temperature was raised to 150–155° C. and after 0.5 hour it was increased to 180–185° C. and maintained for 112 hours. Finally the mixture was refluxed for 7 hours and allowed to stand over night at room temperature. The liquid portion was decanted and a very hard film remaining on the walls of the reaction flask was removed, pulverized, and washed with methyl alcohol, ethyl acetate, and ether to give 1.54 grams (88% yield) of polymer with inherent viscosity of 0.53. The polymer dissolved in the same solvents as the polyhydrazide produced in the preceding examples. An infrared spectral analysis of the polymer showed peaks at 6.06 and 6.45 microns and at 7.0 and 9.0 microns for silicon-phenyl bonds. The polymer was dried under reduced pressure at 100° C. An elemental analysis of the polymer established that it included 70.09% carbon, 4.87% hydrogen, 9.38% nitrogen, and 4.90% silicon. The calculated proportions of the corresponding elements of $(C_{34}H_{26}N_4O_4Si)_n$ are 70.08% carbon, 4.49% hydrogen, 9.61% nitrogen, and 4.82% silicon, confirming the identity of the product.

EXAMPLE 25

Preparation of poly[1,4-phenylene(diphenylsilyl)-1,4-phenylene-(1,3,4-oxadiazole-2,5-diyl)-1,3-phenylene - 2,5-(1,3,4-oxadiazole)].—A 200 milligram sample of the polyhydrazide product of Example 24 having inherent viscosity 0.53 was heated at 1 millimeter pressure for 20 minutes at 150–160° C., then for 3.5 hours at 280–290° C., then for 4 hours at 290–300° C., and finally for 4 hours at 300–310° C. The resultant polymer product had inherent viscosity in pyridine of 0.33, was partially soluble in chloroform and dissolved slowly in hot pyridine. A chloroform soluble specimen with inherent viscosity in chloroform of 0.38 and in pyridine of 0.22 was obtained by heating the polyhydrazide product of Example 24 for 2 hours at 150–160° C., then for 7 hours at 280–290° C. and finally for 6 hours at 290–300° C. An elemental analysis established that the polymer included 74.39% carbon, 4.27% hydrogen, 10.06% nitrogen, and 5.15% silicon. The calculated proportions of the corresponding elements of $(C_{34}H_{22}N_4O_2Si)_n$ are 74.71% carbon, 4.06% hydrogen, 10.25% nitrogen and 5.13% silicon confirming the identity of the polymer.

The inherent viscosity of a sample of polyoxadiazole obtained by the method of Example 25 was increased from 0.22 to 0.29 in pyridine by being heated in air in the temperature range 290–300° C. for 45 minutes. By analysis it was found to include then 5.11% silicon; the calculated proportion of silicon in the polyoxadiazole was 5.13% silicon.

A specimen of the polyoxadiazole product obtained from Example 25 was heated under reduced pressure for 10 minutes at 340° C. Then it was 80% soluble in chloroform and had an inherent viscosity of 0.22 in pyridine. An additional 9% of the polymer was dissolved by triturating with pyridine. The inherent viscosity of the latter fraction was 0.37 in pyridine.

The thermogravimetric analysis (TGA) thermograms shown in FIG. 1 taken of the above described polyoxadiazoles:

(A) poly[1,4-phenylene(diphenylsilyl)-1,4-phenylene-2,5(1,3,4-oxadiazole)]
(B) poly[1,4-phenylene(diphenylsilyl)-1,4-phenylene-(1,3,4-oxadiazole-2,5-diyl)-1,4-phenylene-2,5-(1,3,4-oxadiazole)]
(C) poly[1,4-phenylene(diphenylsilyl)-1,4-phenylene-(1,3,4-oxadiazole-2,5-diyl)-1,3-phenylene-2,5-(1,3,4-oxadiazole)]

indicate that all of the polymers underwent no weight loss due to decomposition when heated to 350° C., suggesting long term stable usefulness up to 350° C. Between 350° C. and 425° C., each polymer lost weight at a very low rate. Above 425° C., the loss of weight of each polymer rose precipitously. Therefore, for comparatively short time intervals, the polymers may be used in the temperature range 350°–425° C. The differential thermal analysis (DTA) thermograms in FIG. 2 of the same polymers show that the polymers underwent no changes below the temperatures at which decomposition begins.

Polymer A began to exhibit exothermic character at about 410° C., and polymers B and C began to exhibit exothermic character at about 380° C. This TGA and DTA thermograms of FIGS. 1 and 2 concur. Test data established that polymer A is somewhat more heat stable than polymers B and C. The DTA thermograms exhibit exothermic peaks at about 500° C. and 580° C. These exothermic peaks are to the decomposition of oxadiazole rings, and diphenylsilarylene units, respectively. Exothermic peaks and shoulders occurring at a temperature higher than 600° C. are probably associated with further thermal oxidation of residual decomposition products.

In other heat stability tests, polymers A, B, C were heated in air for 6 hours at 300° C. at the end of which there was no measurable weight loss; polymers A, B, C were heated in air for 6 hours at 350° C. at the end of which they exhibited very minor weight loss, namely 0.5%, 1.8% and 1.7% respectively. Over an equivalent time period at 400° C., polymers A, B, C exhibited weight losses of 14.0%, 14.3% and 16.5% respectively. From the TGA and DTA results and from the several 6 hour tests, polymer A was found to be the most heat stable of the three polymers.

Films of the three polymers were cast from solutions onto aluminum foil. The specimens were heated for 25 hours in air at 350° C. and then for 6 hours at 400° C. At the end of the heating program, the specimens showed only slight discoloration and the specimens did not crack when the supporting foil was flexed manually. Infrared spectral tests were carried out. Films of the specimens deposited on sodium chloride crystals were subjected to the same heating program as above. Before and after infrared spectral tests were compared and the only difference was the appearance of a very weak peak at 4.48 microns after the heating program. The appearance of this new band is ascribed to the formation of small quantities of isocyanate or nitrile groups due to the decomposition of some of the oxadiazole rings in the backbone or chain ends of the molecules.

We claim:

1. A fully aromatic poly-1,3,4-oxadiazole having a silicon atom attached to at least two aromatic groups in the recurring unit of the polymer and two groups pendant from the silicon atom selected from the group consisting of: aryl, alkyl, aralkyl, alkaryl having the structural formula $$\left[-X'-\underset{\underset{R'}{|}}{\overset{\underset{R}{|}}{Si}}-X-C\underset{O}{\overset{N-N}{\diagup\diagdown}}C-X''-\right]_n$$

where R and R¹ are said two pendant groups and wherein X and X¹ are said aromatic groups selected from the group consisting of phenylene, biphenylene, napthylene, anthrylene, and fluorenylidene, and wherein X'' is of the group consisting of part of the bond between two repeating units,

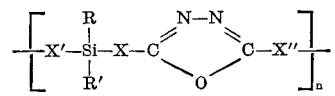, and 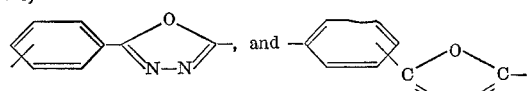

2. A thermally stable silarylene-1,3,4-oxadiazole, soluble in organic solvents selected from the group consisting of:

poly[1,4-phenylene(diphenylsilyl) - 1,4 - phenylene-2,5-(1,3,4-oxadiazole], and poly[1,4 - phenylene(diphenylsilyl) - 1,4 - phenylene-(1,3,4-oxadiazole-2,5-diyl) - 1,4-phenylene-2,5-(1,3,4-oxadiazole)], and poly[1,4 - phenylene(diphenylsilyl) - 1,4 - phenylene-(1,3,4-oxadiazole-2,5-diyl) - 1,3-phenylene-2,5-(1,3,4-oxadiazole)].

3. The oxadiazole defined in claim 2 consisting of poly-[1,4-phenylene(diphenylsilyl) - 1,4 - phenylene-2,5-(1,3,4-oxadiazole)].

4. The oxadiazole defined in claim 2 consisting of poly-[1,4-phenylene(diphenylsilyl)-1,4-phenylene-(1,3,4 - oxadiazole-2,5-diyl)-1,4-phenylene-2,5-(1,3,4-oxadiazole)].

5. The oxadiazole defined in claim 2 consisting of poly-[1,4-phenylene(diphenylsilyl)-1,4-phenylene-(1,3,4 - oxadiazole-2,5-diyl)-1,3-phenylene-2,5-(1,3,4-oxadiazole)].

6. A prepolymer for forming a thermally stable silarylene-1,3,4-oxadiazole soluble in organic solvents by thermal cyclodehydration selected from the group consisting of:

poly[N-(p-diphenylsilylbenzoyl) - N' - (p-benzoyl)hydrazide], poly[N - (p-diphenylsilylbenzoyl)-N',N''-(terephthaloyl)-N'''-(p-benzoyl)dihydrazide], and poly[N-(p-diphenylsilylbenzoyl) - N',N'' - (isophthaloyl)-N''-(p-benzoyl)dihydrazide].

7. The polyhydrazide copolymerization product of bis-(p-chlorocarbonylphenyl)diphenylsilane and hydrazine.

8. The polyhydrazide copolymerization product of one of the group consisting of bis(p-chlorocarbonylphenyl)-diphenylsilane and chlorophenoxyphenyl diphenylsilane and bis(p-carbohydrazidophenyl)diphenylsilane.

9. The polyhydrazide copolymerization product of bis-(p-carbohydrazidophenyl)diphenylsilane and dipentachlorophenyl terephthalate.

10. The polyhydrazide copolymerization product of bis-(p-carbohydrazidophenyl)diphenylsilane and dipentachlorophenyl isophthalate.

References Cited

UNITED STATES PATENTS 3,238,183   3/1966   Frazer _____ 260—78.4

JAMES A. SEIDLECK, Primary Examiner

J. KIGHT III, Assistant Examiner

U.S. Cl. X.R.

117—124, 127, 161; 161—193, 206, 207; 260—29.1, 30.2, 30.8, 32.6, 33.8, 47